US012692971B2

(12) United States Patent
Leman et al.

(10) Patent No.: US 12,692,971 B2
(45) Date of Patent: Jul. 28, 2026

(54) TILTING AND ROTATING CEILING DISPLAY MOUNT

(71) Applicant: CKnapp Sales, Inc., Goodfield, IL (US)

(72) Inventors: Aaron Leman, Morton, IL (US); Nicholas Welander, East Peoria, IL (US); Brandon Meyer, Normal, IL (US); Micah Fehr, Danvers, IL (US)

(73) Assignee: CKnapp Sales, Inc., Goodfield, IL (US)

( * ) Notice: Subject to any disclaimer, the term of this patent is extended or adjusted under 35 U.S.C. 154(b) by 0 days.

(21) Appl. No.: 19/304,595

(22) Filed: Aug. 19, 2025

(65) Prior Publication Data

US 2025/0389373 A1 Dec. 25, 2025

Related U.S. Application Data

(63) Continuation of application No. 18/596,741, filed on Mar. 6, 2024, now Pat. No. 12,422,087, which is a continuation of application No. 17/523,906, filed on Nov. 10, 2021, now Pat. No. 12,007,062.

(51) Int. Cl.
| | |
|---|---|
| *F16M 11/10* | (2006.01) |
| *A47B 97/00* | (2006.01) |
| *F16M 11/18* | (2006.01) |
| *F16M 13/02* | (2006.01) |

(52) U.S. Cl.
CPC ............. *F16M 11/10* (2013.01); *F16M 11/18* (2013.01); *F16M 13/027* (2013.01); *A47B 97/001* (2013.01); *F16M 2200/06* (2013.01)

(58) Field of Classification Search
CPC .. F16M 13/027; F16M 11/10; F16M 11/2014; F16M 11/2064; F16M 11/18; F16M 11/08; F16M 11/126; F16M 11/2021; F16M 11/38; F16M 2200/061; F16M 2200/063; F16M 2200/066; F16M 2200/068; F16M 13/02; F16M 2200/06; F16M 11/12; F16M 11/121; A47B 97/001;

(Continued)

(56) References Cited

U.S. PATENT DOCUMENTS

| | | | |
|---|---|---|---|
| 3,574,340 A | 4/1971 | Busche |
| 4,160,999 A | 7/1979 | Claggett |
| 5,139,223 A | 8/1992 | Sedighzadeh |

(Continued)

FOREIGN PATENT DOCUMENTS

| | | |
|---|---|---|
| CN | 105003806 | 10/2015 |

OTHER PUBLICATIONS

ZeroMax; Jan. 5, 2010; Crown Gear Right Angle Gearbox; https://www.zero-max.com/cb-crown-gear-right-angle-gearbox#1 (Year:2010).

(Continued)

*Primary Examiner* — Ingrid M Weinhold
(74) *Attorney, Agent, or Firm* — Lund IP, PLLC

(57) ABSTRACT

A ceiling display mount includes a tilt mechanism configured to selectively position a secured display from a collapsed position generally parallel to a ceiling to a fully deployed position generally perpendicular to the ceiling. The ceiling display mount further includes a rotation mechanism allowing the secured display to rotate side to side to change the horizontal viewing angle.

26 Claims, 10 Drawing Sheets

(58) Field of Classification Search

CPC ............... A63B 63/083; Y10S 248/917; Y10S 248/919; Y10S 248/921–923

USPC ... 248/288.11, 343, 324, 917, 919, 921–923, 248/371, 317, 323, 342, 278.1

See application file for complete search history.

(56) References Cited

U.S. PATENT DOCUMENTS

| | | | |
|---|---|---|---|
| 5,400,993 | A | 3/1995 | Hamilton |
| 6,053,072 | A | 4/2000 | Schleuder |
| 6,416,027 | B1 * | 7/2002 | Hart ..................... A47B 81/065 |
| | | | 312/7.2 |
| 6,484,993 | B2 | 11/2002 | Huffman |
| 6,655,645 | B1 | 12/2003 | Lu et al. |
| 6,695,376 | B1 | 2/2004 | Hirano |
| 7,055,790 | B2 | 6/2006 | Schroeter |
| 7,317,611 | B2 | 1/2008 | Dittmer |
| 7,320,454 | B2 | 1/2008 | Lee et al. |
| 7,347,119 | B2 | 3/2008 | Sasano |
| 7,445,187 | B2 | 11/2008 | Shin |
| 7,537,189 | B2 | 5/2009 | Jung et al. |
| 7,798,460 | B2 | 9/2010 | Park |
| 10,107,449 | B2 | 10/2018 | Hattabaugh |
| 10,139,045 | B1 | 11/2018 | Keuter |
| 11,619,339 | B2 | 4/2023 | Lee et al. |
| 11,933,449 | B2 | 3/2024 | Rui |
| 11,959,583 | B2 | 4/2024 | Newville et al. |
| 2004/0135050 | A1 | 7/2004 | Lee et al. |
| 2005/0029420 | A1 | 2/2005 | Schroeter |
| 2005/0051688 | A1 | 3/2005 | Dittmer |
| 2005/0179608 | A1 | 8/2005 | Durham et al. |
| 2005/0179618 | A1 | 8/2005 | Oh |
| 2005/0230590 | A1 | 10/2005 | Westbrook |
| 2006/0065806 | A1 | 3/2006 | Shin |
| 2006/0091274 | A1 | 5/2006 | Asamarai et al. |
| 2007/0007413 | A1 | 1/2007 | Jung et al. |
| 2007/0023599 | A1 | 2/2007 | Fedewa |
| 2007/0272815 | A1 | 11/2007 | Chueh |
| 2008/0011927 | A1 | 1/2008 | Park |
| 2008/0149789 | A1 | 6/2008 | Yi et al. |
| 2008/0169109 | A1 | 7/2008 | Buhrke et al. |
| 2009/0159768 | A1 | 6/2009 | Oh |
| 2011/0121151 | A1 | 5/2011 | Stifal |
| 2012/0167486 | A1 | 7/2012 | Lee |
| 2014/0034802 | A1 | 2/2014 | Robbins |
| 2015/0381858 | A1 | 12/2015 | Sterngren |
| 2017/0292648 | A1 | 10/2017 | Hattabaugh |
| 2019/0128472 | A1 | 5/2019 | Kahn |
| 2023/0175635 | A1 | 6/2023 | Rui |
| 2024/0142048 | A1 | 5/2024 | Duanmu et al. |
| 2024/0255095 | A1 | 8/2024 | Newville et al. |

OTHER PUBLICATIONS

Cartona, Michael, "Request for Ex Parte Reexamination of U.S. Pat. No. 12,422,087 under 35 U.S.C. § 302 and 37 C.F.R. § 1.510," filed Apr. 6, 2026, 28 pages, Third Party Requester Reference No. 0249-0002, submitted by Grogan Tuccillo & Vanderleen LLP, Springfield, Massachusetts, to the U.S. Patent and Trademark Office, Alexanria, Virginia.

* cited by examiner

TILTING AND ROTATING CEILING DISPLAY MOUNT

CROSS REFERENCE TO RELATED APPLICATIONS

This application is a continuation of U.S. patent application Ser. No. 18/596,741, titled TILTING AND ROTATING CEILING DISPLAY MOUNT, filed Mar. 6, 2024, which is a continuation of U.S. patent application Ser. No. 17/523, 906, titled TILTING AND ROTATING CEILING DISPLAY MOUNT, filed Nov. 10, 2021, issued as U.S. Pat. No. 12,007,062 on Jun. 11, 2024. The entire contents of these applications are incorporated by reference herein.

TECHNICAL FIELD

This disclosure relates to display mounts.

BACKGROUND

Ceiling display mounts facilitate mounting displays, such as computer monitors and television screens, to the ceiling in a room. Ceiling mounts are useful to allow mounting in any area of a room while conserving floor space and providing visibility over other objects in the room.

BRIEF SUMMARY

As disclosed herein, a ceiling display mount includes a tilt mechanism configured to selectively position a secured display from a collapsed position generally parallel to a ceiling to a fully deployed position generally perpendicular to the ceiling. The ceiling display mount further includes a rotation mechanism allowing the secured display to rotate side to side to change the horizontal viewing angle. Examples disclosed herein may also include a wireless remote that allows a user to operate the tilt mechanism and the rotation mechanism to select desired title and viewing angles remotely.

In one example, a ceiling display mount includes a ceiling mount, a housing, a rotation mechanism rotatably coupling the housing to the ceiling mount, a display mount, and a tilt mechanism coupling the display mount to the housing.

In another example, a system includes a ceiling display mount including a ceiling mount, a housing, a rotation mechanism rotatably coupling the housing to the ceiling mount, a display mount, and a tilt mechanism coupling the display mount to the housing. The system further includes a display mounted to the display mount.

DETAILED DESCRIPTION

Figure 1A:
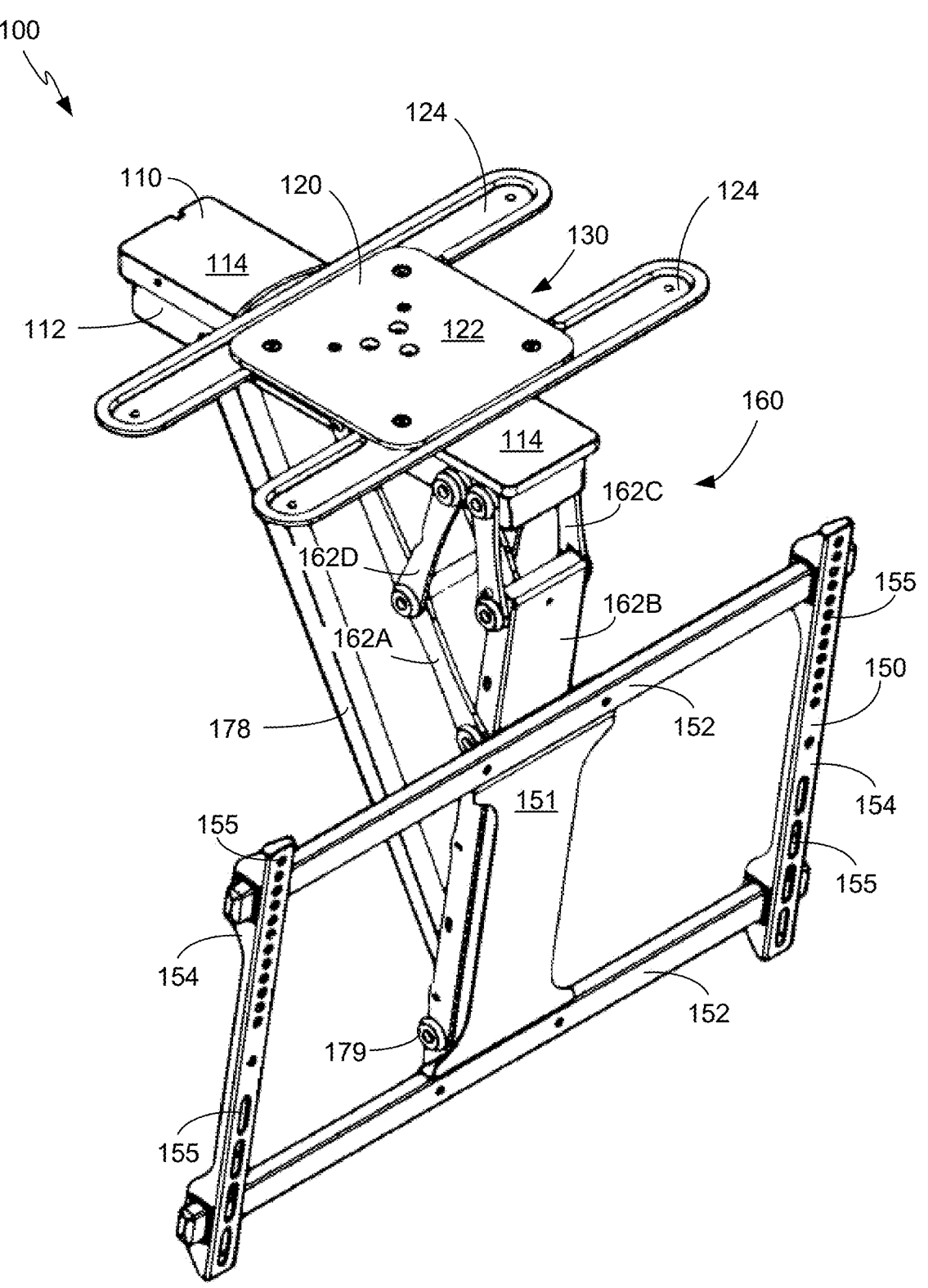
FIGS. 1A and 1B illustrate a ceiling display mount including a tilt mechanism and a rotation mechanism.
Figure 1B:
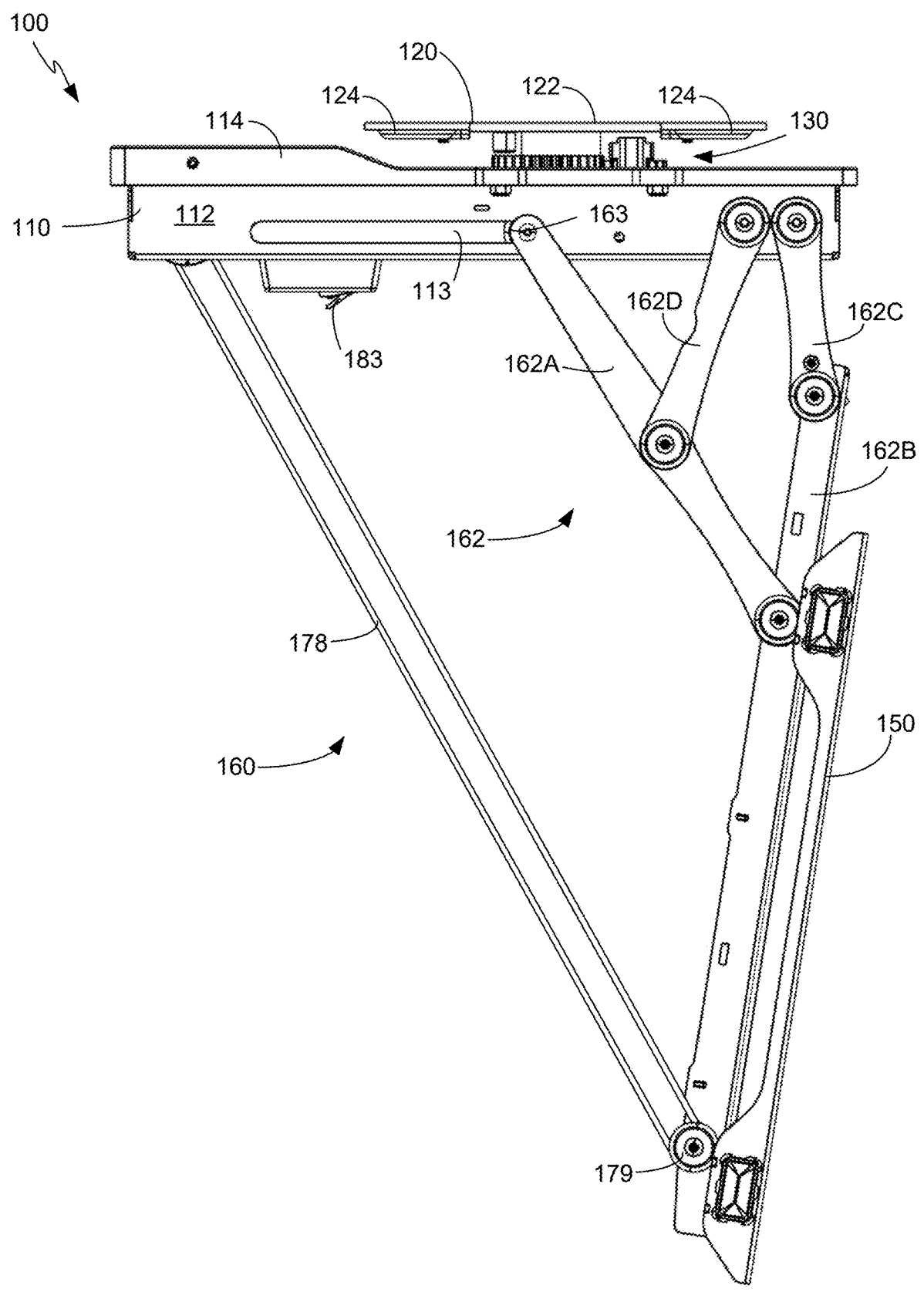

FIGS. 1A and 1B illustrate a ceiling display mount 100. Specifically, FIG. 1A illustrates a side perspective view of ceiling display mount 100, and FIG. 1B illustrates a side view of ceiling display mount 100. Ceiling display mount 100 includes a housing 110 coupled to a ceiling mount 120 with a rotation mechanism 130. Ceiling display mount 100 further includes a display mount 150 coupled to housing 110 with a tilt mechanism 160. Rotation mechanism 130 and tilt mechanism 160 combine allow selective positioning of display mount 150 relative to ceiling mount 120 at any horizontal viewing angle and any tilt viewing angle from about parallel to ceiling mount 120 to about perpendicular to ceiling mount 120.

Housing 110 includes cover 112 with a recess containing motors 131, 161 for rotation mechanism 130 and tilt mechanism 160 respectively. Cover 112 further includes slots 113 which receive the ends of linkage 162A as described in further detail with respect to tilt mechanism 160. Base 114 covers the recess of cover 112 with an opening 115 (FIG. 3B) for rotation mechanism 130 to couple with ceiling mount 120.

Figure 2:
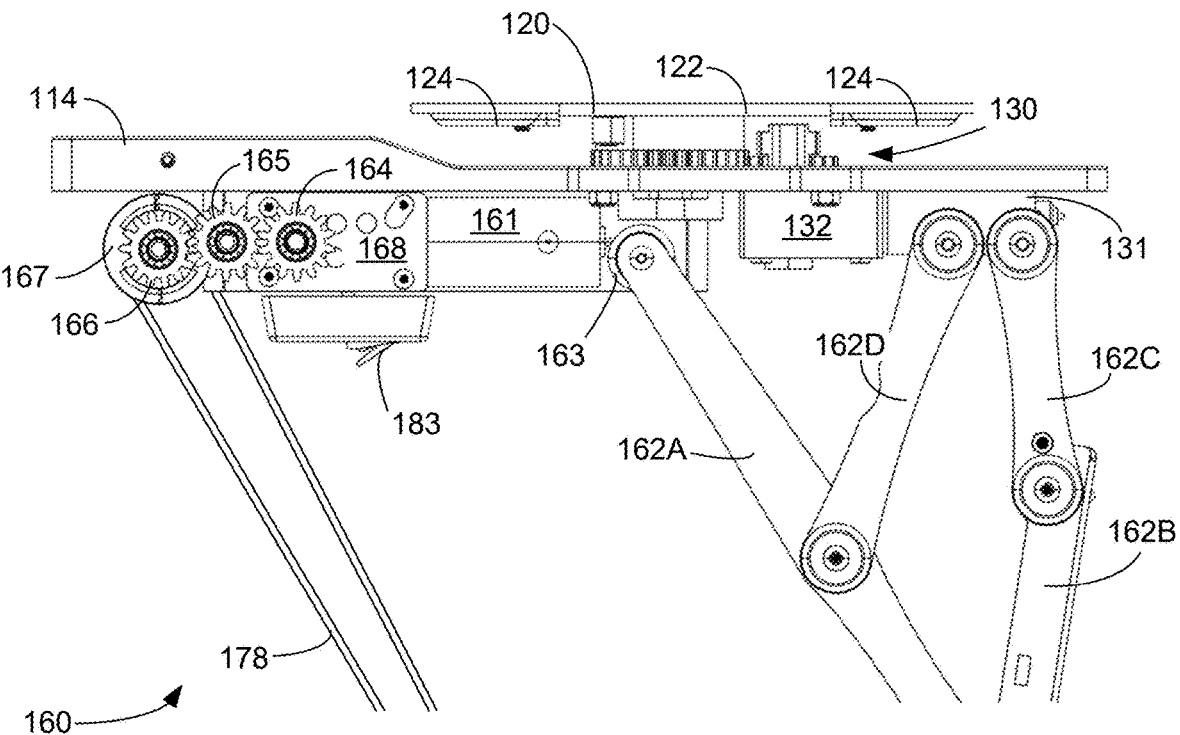
FIG. 2 illustrates portions of the ceiling display mount of FIGS. 1A and 1B including the tilt mechanism.
Figure 3A:
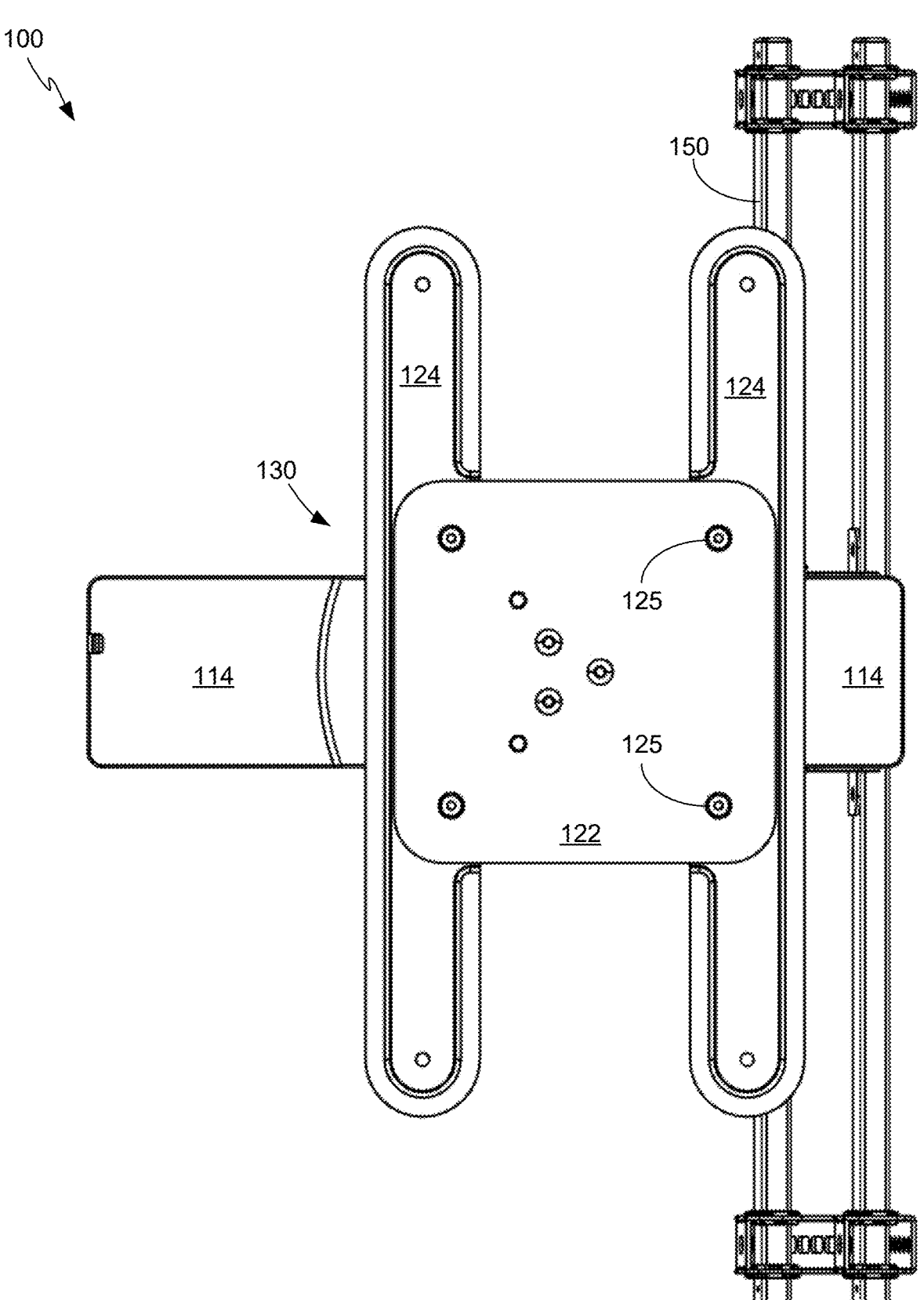
FIGS. 3A-3E illustrate portions of the ceiling display mount of FIGS. 1A and 1B including the rotation mechanism.
Figure 3B:
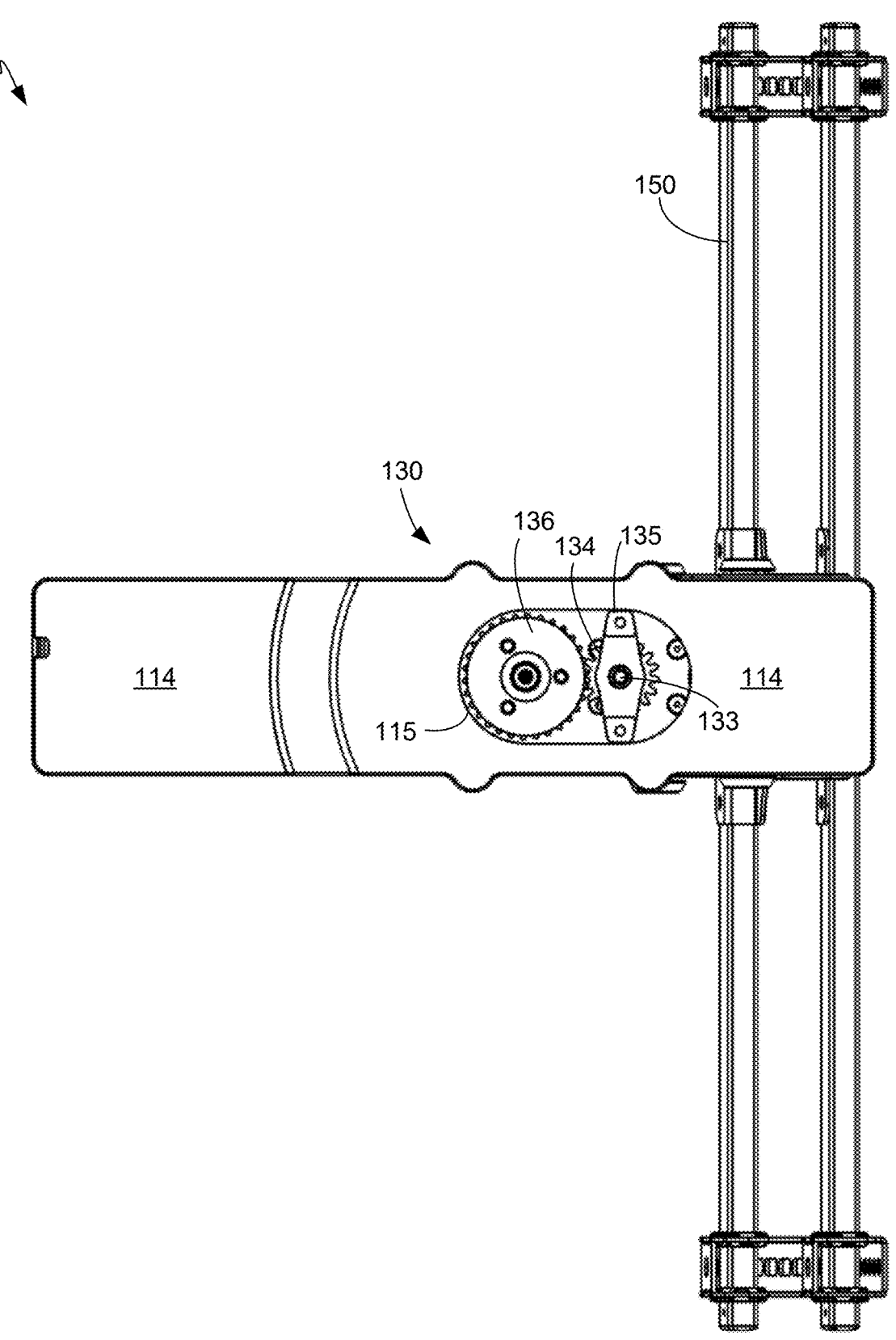
Figure 3C:
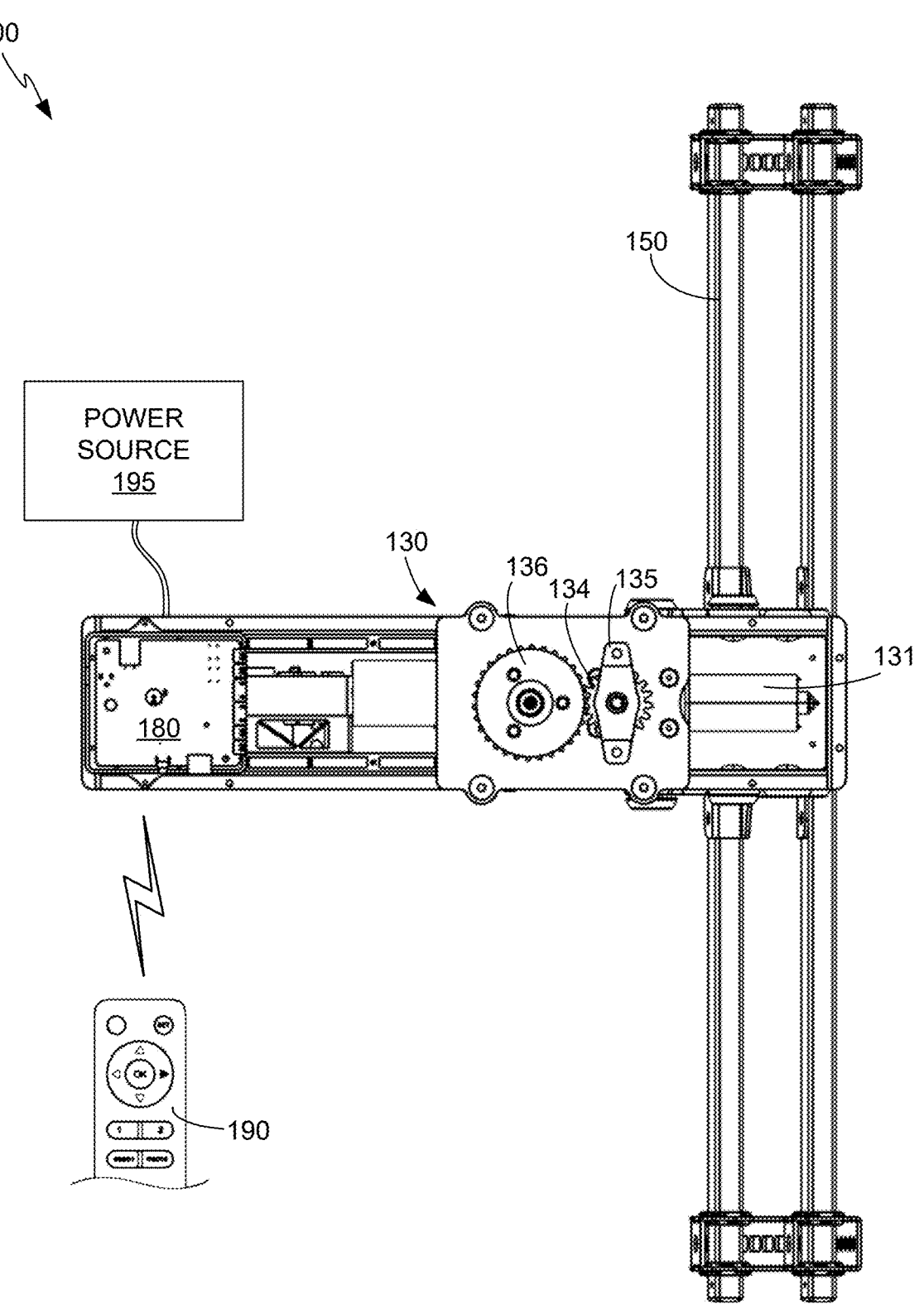
Figure 3D:
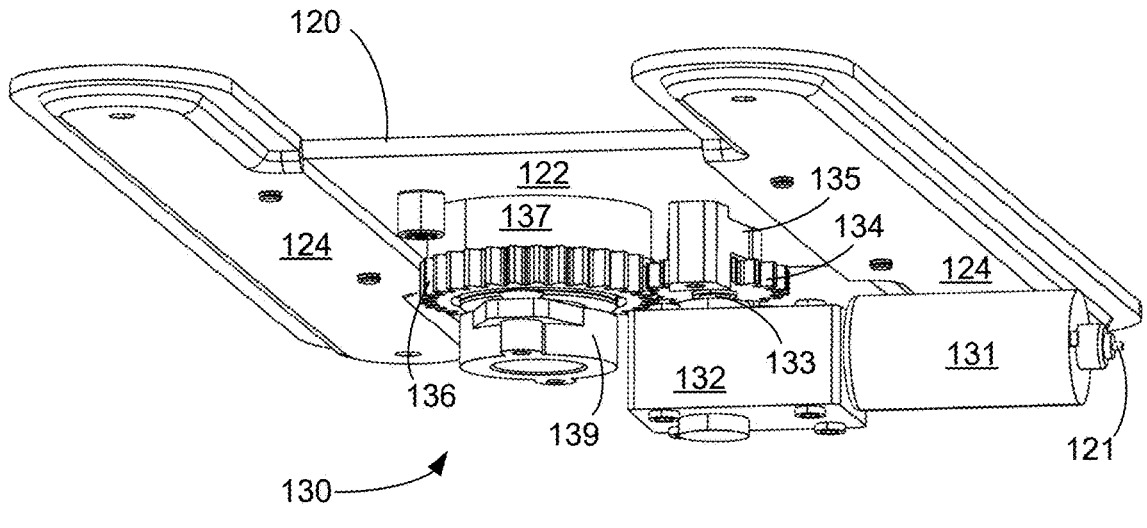
Figure 3E:
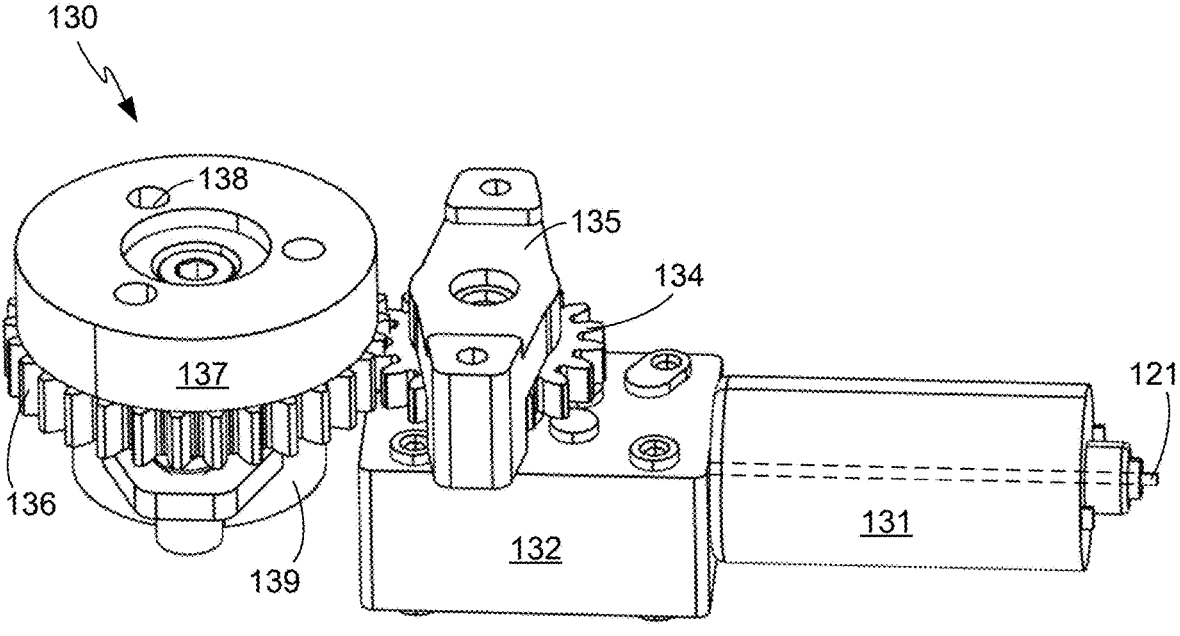

FIG. 2 illustrates a close-up side view of ceiling display mount 100 with cover 112 removed to show portions of rotation mechanism 130 and tilt mechanism 160 in further detail. FIGS. 3A-3E illustrate portions of the ceiling display mount 100 including the rotation mechanism 130. In particular, FIG. 3A is a top view of ceiling display mount 100; FIG. 3B is a top view of ceiling display mount 100 with ceiling mount 120 removed, and FIG. 3C is a top view of ceiling display mount 100 with ceiling mount 120 and base 114 removed. FIG. 3D is a perspective view of rotation mechanism 130 coupled to ceiling mount 120, and FIG. 3E is a perspective view of rotation mechanism 130 without ceiling mount 120.

Ceiling mount 120 include a baseplate 122 and two optional extensions 124. Baseplate 122 may be directly mounted to a ceiling fixture to secure ceiling display mount 100 to the ceiling. Alternatively, extensions 124 may be used to support baseplate 122 against the ceiling. As best shown in FIG. 3A, extensions 124 cover portions of baseplate 122 and are fixed to baseplate 122 with two screws and nuts 125 for each extension 124. Extensions 124 may be formed from a stamped sheet metal to provide increase rigidity compared to a flat sheet metal. In various examples, extensions 124 may be at least 16 inches or at least 24 inches to facilitate direct attachment to structural framing elements behind a finished ceiling surface. It is important for ceiling mount 120 provide sufficient attachment strength to a ceiling to hold the weight of ceiling display mount 100 and a display.

Rotation mechanism 130 rotatably couples housing 110 to ceiling mount 120. Rotation mechanism 130 is operable to rotate housing 110 360 degrees relative to the ceiling mount 120. Rotation mechanism 130 includes an electric motor 131, which drives a right-angle gearbox 132 coupled to an output shaft 121 of the electric motor 131. Electric motor 131 and gearbox 132 may represent a right-angle gearmotor. Electric motor 131 and gearbox 132 are mounted to base 114 of housing 110. As best shown in FIG. 3B, a drive gear 134 is coupled to the output shaft 133 of gearbox 132. Shaft bearing 135 is mounted to the opposing side of base 114 of housing 110 compared to gearbox 132 and supports the output shaft of gearbox 132. Drive gear 134 drives driven gear 136 which is coupled to a coaxial cylindrical mounting bracket 137. Cylindrical mounting bracket 137 includes screw holes 138 to facilitate attachment to baseplate 122 of ceiling mount 120. Shaft bearing 139 supports the shaft of driven gear 136 and is mounted to the same side of base 114 of housing 110 as gearbox 132.

In this manner, the drivetrain of rotation mechanism 130 includes electric motor 131, right-angle gearbox 132, drive gear 134, driven gear 136 and cylindrical mounting bracket 137. As electric motor 131 and gearbox 132 are fixed to housing 110 by way of base 114, and cylindrical mounting bracket 137 is fixed to baseplate 122 of ceiling mount 120, operation of electric motor 131 serves to rotate base 114 relative to ceiling mount 120. Because the remaining components of ceiling display mount 100 are coupled to housing 110, operation of electric motor 131 likewise serves to rotate all components of ceiling display mount 100 except for ceiling mount 120, which configured to be fixedly attached to a ceiling.

Tilt mechanism 160 rotatably couples display mount 150 to housing 110. Tilt mechanism 160 include two separate systems, a support frame including a five-bar linkage 162 comprising cover 112 of housing 110, and linkages 162A, 162B, 162C and 162D as well as a drive system including electric motor 161, spool 167 and strap 178. Display mount 150 is coupled to linkage 162B.

Linkages 162C and 162D include pivots rotatably coupled to cover 112. In addition, linkage 162A includes a bearing 163 which slides within slot 113 of cover 112 to provide a single degree of freedom for five-bar linkage 162 and to provide further rigidity and support to the connection between housing 110 and five-bar linkage 162. In this manner linkage 162A is slidably coupled to cover 112. Linkage 162B is fixedly coupled to the display mount 150 and free from housing 110 except by way of pivot connections to linkages 162A, 162C.

Display mount 150 includes a center mounting plate 151 coupled to linkage 162B, two horizontal bars 152, and two vertical members 154 with mounting holes 155. In some examples, mounting holes 155 may conform to a VESA standard display mount, which includes rectangular hole patterns such as 50×20 mm, 75×35 mm, 75×75 mm, 100× 100 mm, 200×100 mm, 400×200 mm, 600×400 mm and others in 200 mm increments.

Five-bar linkage 162 is driven by strap 178 to lift the display mount 150 as strap 178 is spooled on spool 167. Gravity lowers the display mount 150 when strap 178 is unspooled from spool 167. The drive mechanism of tilt mechanism 160 includes an electric motor 161, which drives a right-angle gearbox 168. Electric motor 161 and gearbox 168 may represent a right-angle gearmotor. Electric motor 161 and gearbox 168 are mounted to base 114 of housing 110. As best shown in FIG. 2, a drive gear 164 is coupled to the output shaft of gearbox 168. Drive gear 164 drives idler gear 165, which drives driven gear 166. Driven gear 166 is coaxially coupled to spool 167. In this manner, the drivetrain of tilt mechanism 160 includes electric motor 161, right-angle gearbox 168, drive gear 164, idler gear 165, driven gear 166 and spool 167.

As driven gear 166 rotates, spool 167 rotates to either wind-up or unwind strap 178. Strap 178 is looped around roller bearing 179 on the distal end of linkage 162B. The distal end of strap 178 is coupled to base 114 of housing 110. In this manner, winding strap 178 on spool 167 by operating motor 161 lifts the distal end of linkage 162B, which lifts display mount 150. In contrast, unwinding strap 178 from spool 167 by operating motor 161 lowers the distal end of linkage 162B, which allows display mount 150 to tilt downward. The downward movement of display mount 150 is assisted by gravity due to the weight of five bar linkage 162, display mount 150 and a display mounted thereon, if any.

As shown in FIG. 3C, ceiling display mount 100 may include a controller 180 within housing 110. Controller 180 includes a wireless receiver configured to receive tilt inputs and rotation inputs from a remote 190. In turn controller 180 issues control signals to motors 131, 161 to operate tilt mechanism 160 and rotation mechanism 130 according to the tilt inputs and rotation inputs respectively. In some examples, controller 180 and/or remote 190 may allow a user to store preset positions to quickly return a display to a desired viewing or storage position. Such preset positions would represent stored tilt and rotation information.

Ceiling display mount 100 further includes a limit switch 183 (FIG. 2). Limit switch 183 operates to limit further operation of motor 161 when tilt mechanism 160 has reached the fully retracted position. For example, limit switch 183 may cut off power to motor 161 or may provide a signal to controller 180 to prevent further operation of motor 161 to drive spool 167 and retract strap 178. The use of limit switch 183 protects the components of tilt mechanism 160 while also allowing full retraction without needing to precise calibration according to the length (or stretch) of strap 178.

Ceiling display mount 100 includes a power source 195 for operating controller 180 and motors 131, 161. In various examples, the power source 195 may be a cord for coupling to an outside power source, such as a standard home alternating current (AC) power source, e.g., 120 volts or 240 volts. In other examples, the power source 195 include batteries, either internal or external to housing 110.

Figure 4A:
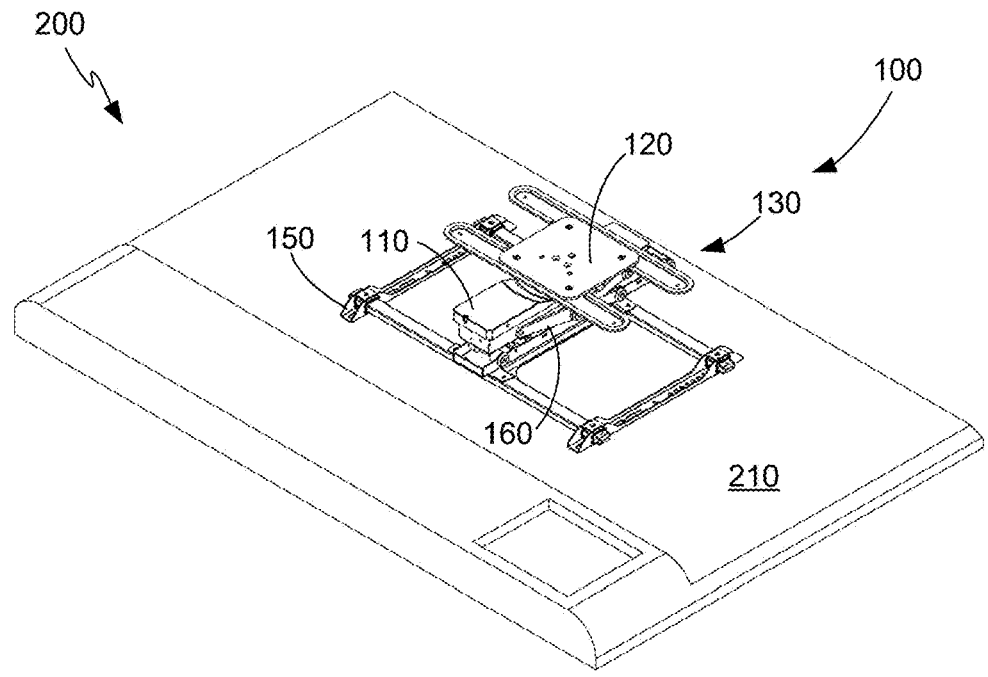
FIGS. 4A-4E illustrate an assembly including the ceiling display mount of FIGS. 1A and 1B and a display secured thereon in various positions.

FIGS. 4A-4E illustrate an assembly 200 including ceiling display mount 100 and a display 210 secured thereon in various positions. Specifically, FIG. 4A illustrates display 210 in a fully retracted position, such that display 210 is about parallel to a ceiling mounting surface of ceiling mount 120 and a ceiling its mounted to. As referred to herein, about parallel means within 15 degrees on either side of parallel, such as within 10 degrees of parallel, within 5 degrees of parallel, or even within 2 degrees of parallel.

Figure 4B:
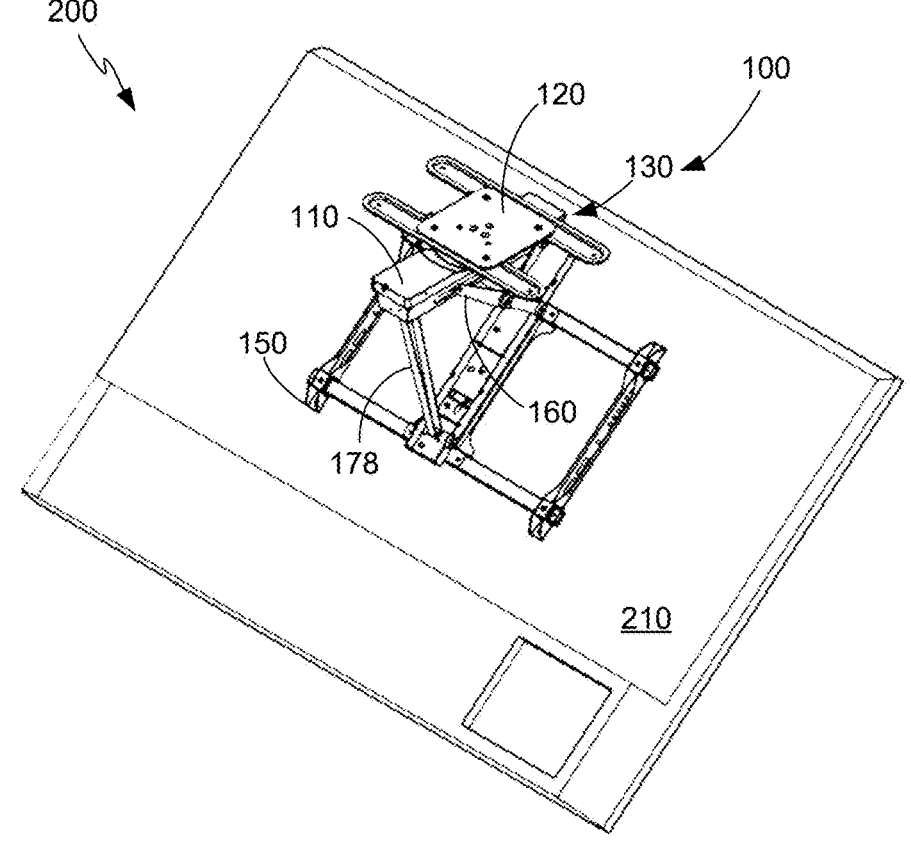
Figure 4C:
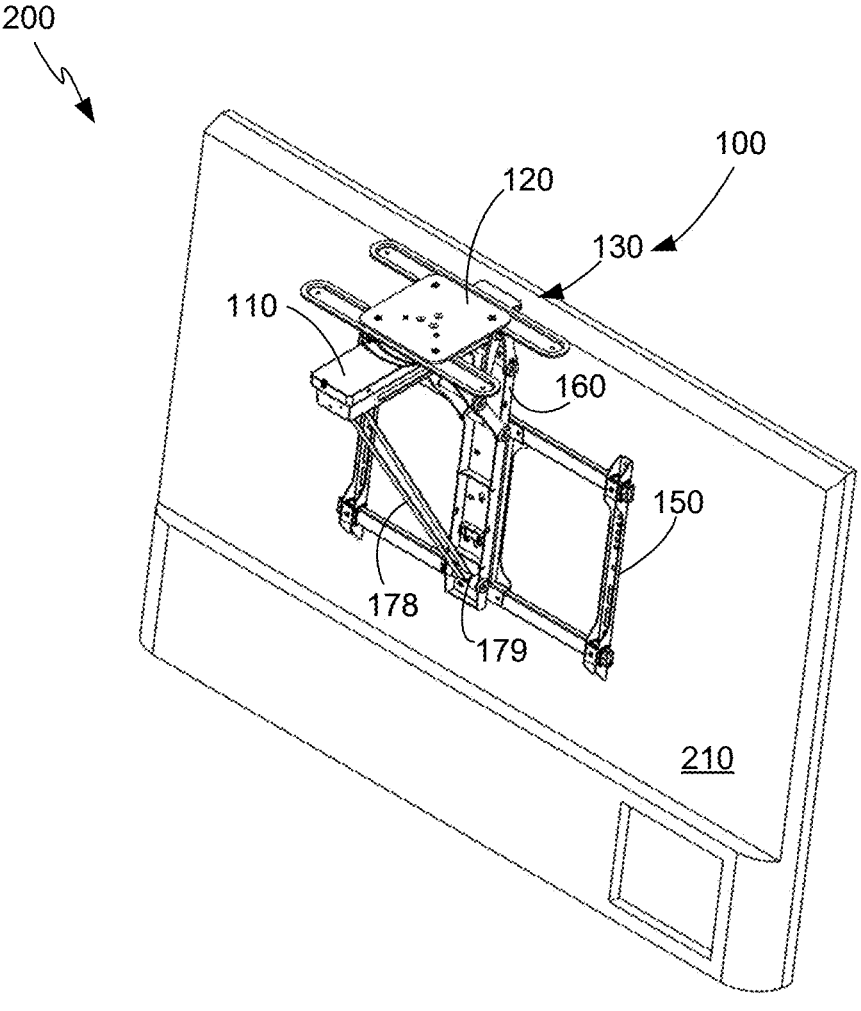

In contrast, FIG. 4B illustrates display 210 in a partially retracted position, such that display 210 is tilted about 45 degrees downward from parallel to ceiling mount 120. FIG. 4C illustrates display 210 in a fully lowered position, such that display 210 is tilted downward to an about perpendicular position relative to the ceiling mounting surface of ceiling mount 120. As referred to herein, about perpendicular means within 15 degrees on either side of perpendicular, such as within 10 degrees of perpendicular, within 5 degrees of perpendicular, or even within 2 degrees of perpendicular.

Motor 161 operates to rotate spool to unwind strap 178 to lower display 210 from the fully retracted position of FIG. 4A to the partially retracted position of FIG. 4B and/or the fully lowered position of FIG. 4C. Likewise, motor 161 operates to rotate spool to wind strap 178 to raise display 210 from partially retracted positions, such as the partially retracted position of FIG. 4B and/or the fully lowered position of FIG. 4C. In this manner, tilt mechanism 160 facilitates selectively positioning display 210 in any tilt angle between the fully retracted position of FIG. 4A and the fully lowered position of FIG. 4C.

Figure 4E:
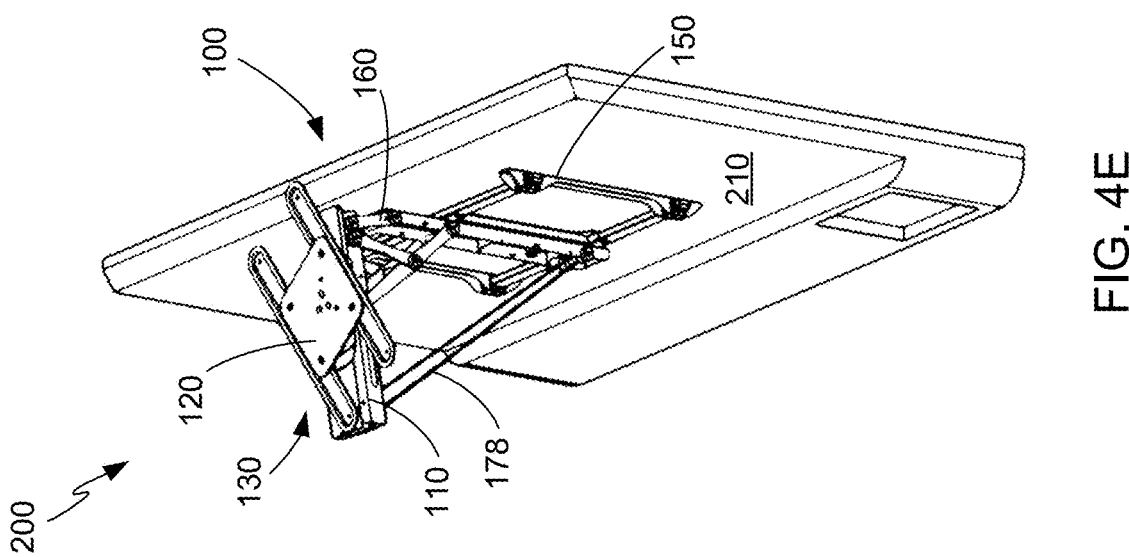
Figure 4D:
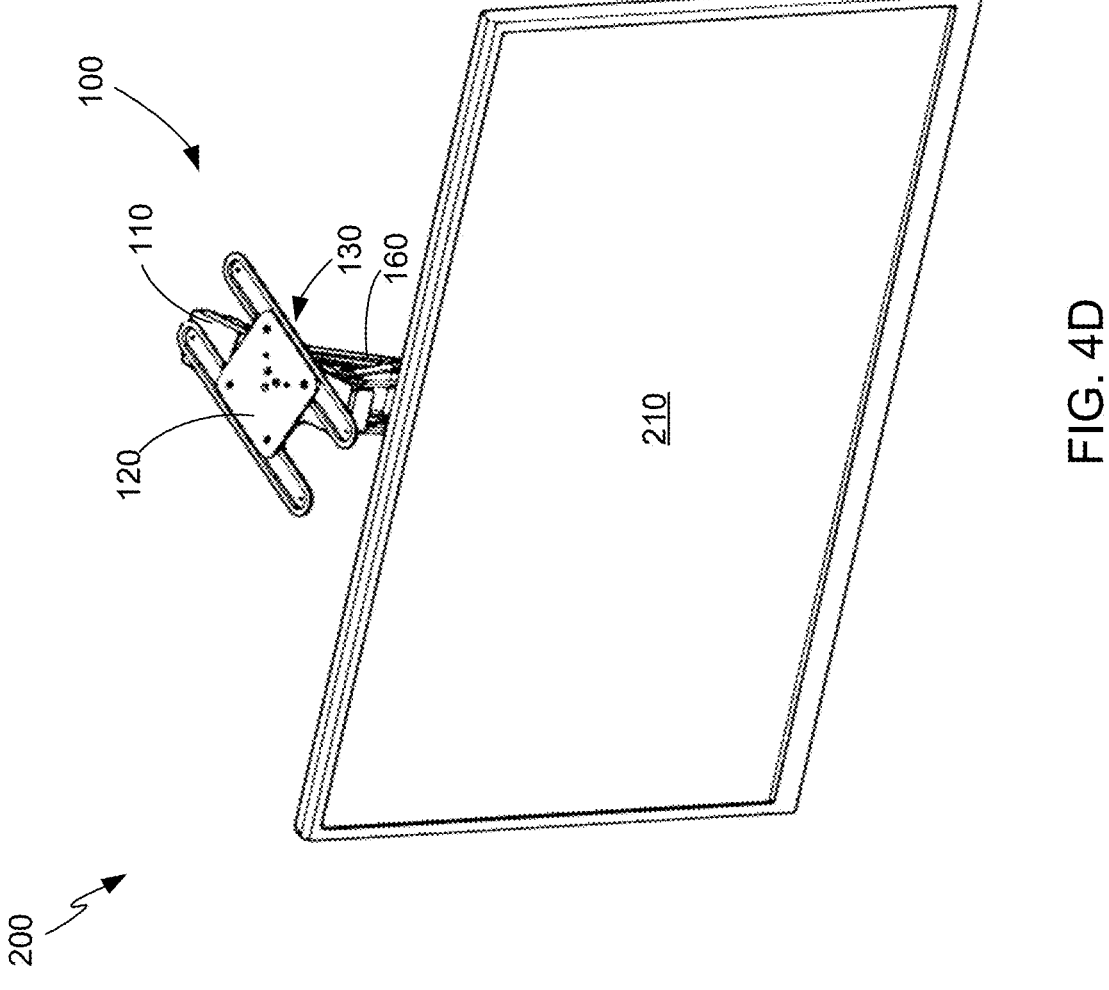

FIG. 4D illustrates display 210 in a fully lowered position, but rotated to the left compared to FIG. 4C. Similarly, FIG. 4E illustrates display 210 in a fully lowered position, but rotated to the right compared to FIG. 4C. Through the operation of rotation mechanism 130, display 210 may be rotated in any angle or even within a full circle compared to ceiling mount 120. Moreover, rotation mechanism 130 may be used to rotate display 210 at any angle in combination with any selected tilt angle using tilt mechanism 160. Accordingly, ceiling display mount 100 allows infinite adjustability for rotation angles and tilt within the range of tilt provided tilt mechanism 160.

Ceiling display mount 100 may provide one or more advantages compared to other ceiling display mounts. For example, the rotation mechanism allows ceiling mount 120 to be attached to the ceiling at any angle no matter the desired viewing angles for display 210. This may be particularly useful for securing ceiling mount 120 to trusses or other building framing. In addition, by combining both rotation and tilt mechanisms, the viewing angle may be adjusted to any desired position after mounting ceiling display mount 100. Such a configuration not only allows for multiple viewing angles, but also for reduced install time as the specific orientation of ceiling display mount 100 in not critical to positioning the display in a desired viewing orientation.

Moreover, because ceiling display mount 100 may be operated using remote 190, multiple viewing positions may be selected by a user from a remote position. In addition, display 210 may be stored flat against a ceiling when not in use, as shown in FIG. 4A.

The specific techniques for ceiling display mounts including a tilt mechanism and a rotation mechanism, including techniques described with respect to ceiling display mount 100 and assembly 200, are merely illustrative of the general inventive concepts included in this disclosure as defined by the following claims.

What is claimed is:

1. A ceiling display mount comprising:
   a ceiling mount;
   a housing including a base and a cover including sidewalls forming a recess therebetween,
   wherein the cover is coupled to the base opposite the ceiling mount with the base spanning the sidewalls, and the base is positioned between the cover and the ceiling mount;
   a rotation mechanism rotatably coupling the housing to the ceiling mount, the rotation mechanism including:
      a first electric motor coupled to an opposing side of the base relative to the ceiling mount, and
      a gear train coupled to an output shaft of the first electric motor, such that the first electric motor is operable to rotate the housing relative to the ceiling mount via the gear train,
      wherein the gear train includes a driven gear fixed to the ceiling mount,
      wherein the base includes an opening through which the gear train extends to couple with the ceiling mount with the driven gear on an opposite side of the base relative to the first electric motor;
   a display mount rotatably coupled to the housing; and
   a tilt mechanism with a second electric motor coupled to the housing and operable to raise and lower the display mount relative to the housing,
   wherein the first electric motor extends laterally relative to the base, and
   wherein the second electric motor extends laterally relative to the base.

2. The ceiling display mount of claim 1, wherein the tilt mechanism further comprises a linkage between the display mount and the housing, wherein the linkage includes:
   a first bar rotatably coupled to the housing with a first pivot; and a second bar rotatably coupled to the first bar of the linkage with a second pivot and rotatably coupled to the display mount with a third pivot.

3. The ceiling display mount of claim 2, wherein the linkage includes:
   a third bar between the display mount and the housing, the third bar rotatably coupling the display mount to the housing; and
   a fifth pivot rotatably coupling the third bar to the housing,
   wherein the display mount is directly rotatably coupled to the third bar with a fourth pivot.

4. The ceiling display mount of claim 2, wherein an end of the second bar opposite the third pivot includes a slideable connection with the housing.

5. The ceiling display mount of claim 2, wherein the first bar of the linkage is rotatably coupled to one of the sidewalls of the cover of the housing with the first pivot.

6. The ceiling display mount of claim 1, wherein the second electric motor is coupled to the base of the housing.

7. The ceiling display mount of claim 1,
   wherein the tilt mechanism includes a right angle gearbox, and
   wherein the second electric motor drives the right angle gearbox to raise and lower the display mount relative to the housing.

8. The ceiling display mount of claim 1, wherein the tilt mechanism includes:
   a spool operably coupled to the second electric motor; and
   a strap configured to wind and unwind on the spool, wherein the strap is attached to the display mount to raise and lower the display mount.

9. The ceiling display mount of claim 8, wherein the strap is looped around a roller attached to the display mount with an end of the strap coupled to the housing.

10. The ceiling display mount of claim 8, wherein lowering the display mount by unwinding the strap is gravity-assisted.

11. The ceiling display mount of claim 1, wherein the tilt mechanism is operable to tilt the display mount between a fully retracted position about parallel to a ceiling mounting surface of the ceiling mount and a fully lowered position within 15 degrees of perpendicular to the ceiling mounting surface of the ceiling mount.

12. The ceiling display mount of claim 11, wherein the fully retracted position is within 15 degrees of parallel to a ceiling mounting surface of the ceiling mount.

13. The ceiling display mount of claim 1, further comprising a limit switch that limits further retraction of the tilt mechanism when the display mount is in a fully retracted position.

14. The ceiling display mount of claim 1, wherein the display mount is rotatably coupled to the cover of the housing.

15. The ceiling display mount of claim 1, wherein the gear train further includes:
   a right angle gearbox coupled to the first electric motor; and
   a drive gear coupled to an output shaft of the right angle gearbox.

16. The ceiling display mount of claim 15, wherein the drive gear and the driven gear are oriented and rotate within a common plane between the first electric motor and the ceiling mount.

17. The ceiling display mount of claim 1, wherein the rotation mechanism includes a mounting bracket coupled to the ceiling mount, wherein the first electric motor is operable to rotate the housing relative to the ceiling mount via the mounting bracket.

18. The ceiling display mount of claim 17, wherein the gear train further includes a right-angle gearbox coupled to an output shaft of the first electric motor such that the first electric motor drives the right-angle gearbox to rotate the housing relative to the ceiling mount.

19. The ceiling display mount of claim 1, wherein the rotation mechanism is operable to rotate the housing 360 degrees relative to the ceiling mount.

20. The ceiling display mount of claim 1, wherein the ceiling mount includes a baseplate and two extensions.

21. The ceiling display mount of claim 1, wherein the display mount includes mounting holes that conform to a VESA standard mount.

22. The ceiling display mount of claim 1, further comprising a controller including a wireless receiver configured to receive tilt inputs and rotation inputs from a remote and to operate the tilt mechanism and the rotation mechanism according to the tilt inputs and rotation inputs respectively.

23. The ceiling display mount of claim 22, wherein the controller is within the recess of the housing.

24. The ceiling display mount of claim 22, further comprising a wireless remote operable to send wireless signals including tilt inputs and rotation inputs.

25. The ceiling display mount of claim 1, further comprising a power source selected from a group consisting of:
    a cord for coupling to an outside alternating current (AC) power source;
    a battery internal to the housing; and
    a battery external to the housing.

26. The ceiling display mount of claim 1, further comprising a display mounted to the display mount.

* * * * *